US005677048A

United States Patent [19]

Pushaw

[11] Patent Number: 5,677,048
[45] Date of Patent: Oct. 14, 1997

[54] COATED SKIVED FOAM AND FABRIC ARTICLE CONTAINING ENERGY ABSORBING PHASE CHANGE MATERIAL

[75] Inventor: Robert J. Pushaw, Havertown, Pa.

[73] Assignees: Gateway Technologies, Inc., Boulder, Colo.; R.H. Wyner & Assoc., Inc., W. Bridgewater, Mass.

[21] Appl. No.: 606,487

[22] Filed: Mar. 4, 1996

[51] Int. Cl.[6] .................................................. B32B 5/16
[52] U.S. Cl. ............................. 428/320.2; 428/321.1; 428/323; 428/327; 442/315
[58] Field of Search ............... 428/320.2, 321.1, 428/323, 327; 442/315

[56] References Cited

U.S. PATENT DOCUMENTS

| | | |
|---|---|---|
| 3,852,401 | 12/1974 | Suzuki et al. |
| 4,003,426 | 1/1977 | Best et al. |
| 4,446,917 | 5/1984 | Hayes. |
| 4,504,402 | 3/1985 | Chen et al. |
| 4,531,511 | 7/1985 | Hochberg. |
| 4,572,884 | 2/1986 | Benson et al. |
| 4,581,285 | 4/1986 | Mahefkey, Jr. |
| 4,587,279 | 5/1986 | Salyer et al. |
| 4,612,239 | 9/1986 | Dimanshteyn et al. |
| 4,617,332 | 10/1986 | Salyer et al. |
| 4,645,613 | 2/1987 | Harvey et al. |
| 4,711,813 | 12/1987 | Salyer. |
| 4,747,240 | 5/1988 | Voisinet et al. |
| 4,756,968 | 7/1988 | Bryant et al. |
| 4,774,133 | 9/1988 | Doree. |
| 4,797,160 | 1/1989 | Salyer. |
| 4,825,939 | 5/1989 | Salyer et al. |
| 4,856,294 | 8/1989 | Scaringe et al. |
| 5,053,446 | 10/1991 | Salyer. |
| 5,069,358 | 12/1991 | Avery, Jr. |
| 5,106,520 | 4/1992 | Salyer. |
| 5,211,949 | 5/1993 | Salyer. |
| 5,254,380 | 10/1993 | Salyer. |
| 5,282,994 | 2/1994 | Salyer. |
| 5,290,904 | 3/1994 | Colvin et al. |
| 5,415,222 | 5/1995 | Colvin et al. |
| 5,499,460 | 3/1996 | Bryant et al. |

FOREIGN PATENT DOCUMENTS

WO 93/24241  12/1993  WIPO.

*Primary Examiner*—Helen Lee
*Attorney, Agent, or Firm*—Carol W. Burton, Esq.; Holland & Hart, LLP

[57] ABSTRACT

A coating composition for skived foam substrates includes a polymer binder in which microspheres containing a phase change material are dispersed. Preferred phase change materials include paraffinic hydrocarbons. The microspheres may be microencapsulated. The preferred substrate is a skived polyurethane foam of from 20 to 90 mils in thickness, having up to 6 ounces per square yard or more of encapsulated phase change material embedded in a polymer binder. Polyether and polyester urethanes are preferred. A preferred method of applying the binder with embedded encapsulated phase change materials using knife over roll technique to an exposed surface of the skived foam is disclosed in which the most preferred viscosity of the uncured polymer binder is from 7,000 to 9,000 centipoise.

17 Claims, 1 Drawing Sheet

COATED SKIVED FOAM AND FABRIC ARTICLE CONTAINING ENERGY ABSORBING PHASE CHANGE MATERIAL

FIELD OF THE INVENTION

This invention relates to coatings for substrates containing energy absorbing, temperature stabilizing phase change materials and methods of manufacturing same. More particularly, this invention relates to substrate coatings containing microspheres of phase change material dispersed in a foam binder and methods of manufacturing same.

RELATED APPLICATIONS

The present application pertains to an invention which is elated to the subject matter of U.S. patent application Ser. No. 08/477,824 for FABRIC COATING CONTAINING ENERGY ABSORBING PHASE CHANGE MATERIAL AND METHOD OF MANUFACTURING SAME, filed Jun. 7, 1995, which is assigned to the assignees of the present invention. Ser. No. 08/477,824 is a continuation-in-part application of 08/259,964, filed Jun. 14, 1994, for titled FABRIC COATING CONTAINING ENERGY ABSORBING PHASE CHANGE MATERIAL AND METHOD OF MANUFACTURING SAME. Ser. No. 08/259,964 is also assigned to the assignees of the present invention and contains subject matter which pertains to the present application.

BACKGROUND OF THE INVENTION

Recently, microencapsulated phase change materials have been described as a suitable component for substrate coatings when exceptional heat transfer and storage capabilities are desired. In particular, U.S. Pat. No. 5,290,904 for "Fabric with Reversible Enhanced Thermal Properties" to Colvin, et al. teaches that substrates coated with a binder containing microcapsules filled with energy absorbing phase change material enables the substrate to exhibit extended or enhanced heat retention or storage properties.

Research has demonstrated that applying a binder containing microspheres of phase change materials with commercial coating equipment can be problematic. It has been found to be especially difficult to maintain the durability, moisture vapor permeability, elasticity, flexibility, softness and weight of coated substrates when the coating is loaded with a sufficiently high content of encapsulated phase change material.

More particularly, when an acrylic compound is used as a binder in which microencapsulated phase change material is disbursed is applied to a fabric and cured, subsequent product durability may suffer. The finished product may be susceptible to cracking or flaking. Deeper penetration of the coating compound into the base substrate may be attempted in an effort to minimize cracking and flaking. While durability of the resulting product may be satisfactory, the final product be unacceptably stiff.

Coatings of encapsulated phase change materials embedded in acrylic binders on elastic substrates are also problematical because elasticity of the finished product is compromised, and stretching of the coating can result in flaking of the coating. While substituting a latex binder for the acrylic binder alleviates some of the elasticity loss and flaking experienced with acrylic binders on elastic substrates, loading of the latex binder with a decreased amount to encapsulated phase change material may be required. To compensate and apply the desired amount of encapsulated phase change material, an increased amount of latex binder may be applied. However, this solution tends to reduce the flexibility expected to be achieved with a latex binder. The thicker latex coating may also have the effect of reducing moisture permeability and increasing tackiness of the finished product.

It is against this background that the significant improvements and advancement of the present invention have taken place in the field of substrate coatings containing energy absorbing, temperature stabilizing phase change materials and methods of manufacturing same.

OBJECTS OF THE INVENTION

It is the principal object of the present invention to provide an improved substrate coating composition containing phase change material of a density sufficient to effect or control heat and energy transfer across the coating and/or store heat in the coating.

It is another object of the present invention to provide a coating composition of the foregoing character which will maintain substantially all of the breatheability, flexibility or other principal qualities of the substrate to which it is applied.

It is a still further object of the present invention to provide coated substrates having the aforementioned qualities which are durable, resistant to heat, moisture, solvents, laundering, and/or dry cleaning, without degradation to or loss of the phase change material.

It is still another object of the present invention to provide an improved method of applying coating compositions containing phase change materials and having the aforementioned qualities as coatings on substrates by utilizing commercially available equipment.

It is still another object of the present invention to develop a coating formulation and method suitable for application of a binder and phase change material composition to extensible substrates.

SUMMARY OF THE INVENTION

The present invention comprises coatings containing encapsulated phase change material for foamed substrates, and methods for manufacturing the same. A preferred coating includes microspheres containing a phase change material dispersed throughout an acrylic binder and applied to a skived polyurethane foam. Preferred phase change materials include paraffinic hydrocarbons. A preferred substrate is a skived polyurethane foam of from 20 mils to 90 mils in thickness, having up to 6 ounces or more per square yard of encapsulated phase change material embedded in the acrylic binder. Polyether and polyester urethanes are preferred skived foams.

A preferred method of applying the polymer binder with embedded encapsulated phase change materials to an exposed surface of the skived foam using knife over roll technique is disclosed. Most preferably, the uncured polymer binder used to coat the skived foam has a viscosity of from approximately 7,000 to approximately 9,000 centipoise.

DETAILED DESCRIPTION OF THE INVENTION

Figure 1:
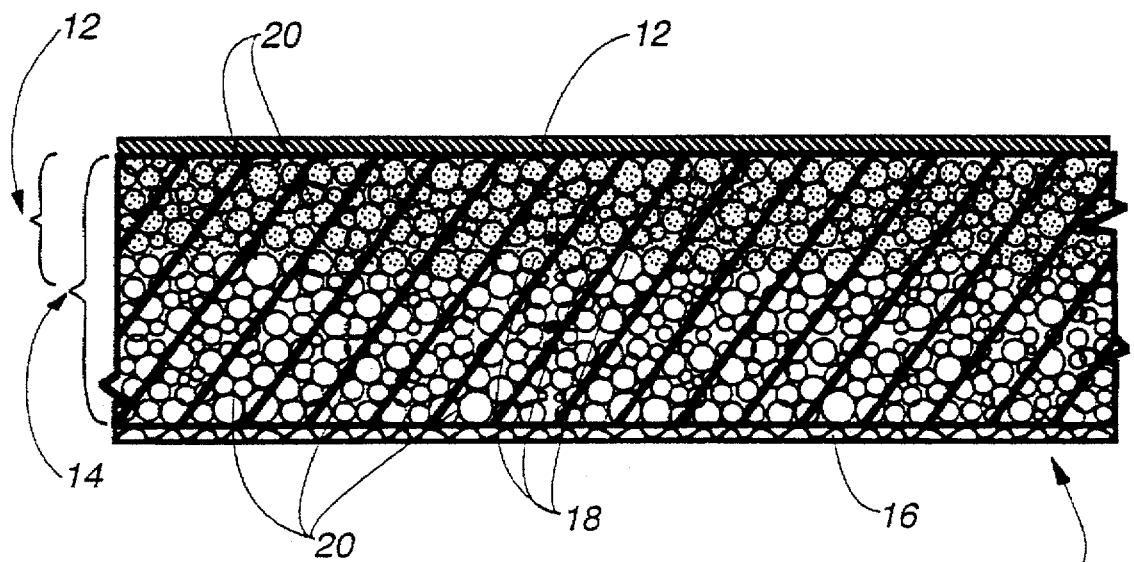
FIG. 1 is a section view of the coated article of the present invention, in which a polymer binder containing microencapsulated phase change materials are coated on and dispersed in the open celled structure of a skived foam substrate, which is in turn attached to a fabric substrate.

In accordance with the present application, it has been discovered that applying a polymer binder in which microspheres of phase change materials are dispersed, to a skived foam substrate attached to a fabric sheet, results in a finished product in which structural integrity of the skived foam substrate is maintained. In addition, the finished product has an unexpectedly high level of loading of the encapsulated phase change materials, thereby providing exceptional control of thermal conductivity across the coated, skived foam.

The polymer binder may be in the form of a solution, dispersion or emulsion in water or in organic solvent. The polymer binder may initially be polymeric, or in the form of monomers and/or oligomer, or low molecular weight polymers which upon drying and/or curing are converted to their final molecular weight and structure. These binders are preferably film-forming, elastomeric, and have a glass transition temperature in the range of about −45° C. to +45° C., depending upon the desired application. For most garment applications, an elastomeric polymer with a glass transition temperature of about −30° C. to about +12° C. is preferred.

The polymers may be linear or branched. Copolymers may be random, block or radial. The polymers may have pendant reactive groups, reactive ends or other crosslinking mechanisms, or be capable of entanglement and/or hydrogen bonding in order to increase the toughness of the finished coating and/or its resistance to heat, moisture, solvents, laundering, dry-cleaning or other chemicals.

Suitable monomers include, but are not limited to, acrylic esters (preferably alkyl-acrylate and methacrylates containing 4 to 17 carbon atoms); styrene; isoprene; acrylonitrile; butadiene; vinyl acetate; vinyl chloride; vinyldiene chloride; ethylene; butylene; propylene; chloroprene; etc. Polymers and copolymers based upon the above mentioned monomers and/or upon silicone; epoxy; polyurethane; fluorocarbons; chlorosulfonated polyethylene; chlorinated polyethylene; and other halogenated polyolefins are also useful.

A preferred polymer binder is made with a dispersed polymer latex is an anionic, heat reactive, acrylic latex containing 59% non-volatiles in water, such as the acrylic polymer latex marketed under the trade name Hycar XT9202™ and available from B. F. Goodrich Chemical Company of Cleveland, Ohio. The polymer latex has a glass transition temperature of −25° C. When properly dried and cured, substrate coatings made from polymer latex such as Hycar XT9202™ are washable and dry-cleanable.

The coating compositions of the present invention preferably include from 30 to 500 parts by dry weight of microspheres for each 100 parts by dry weight of acrylic polymer latex. The coating compositions preferably include from 0.005% to 6% dry weight each of surfactant and dispersant to dry weight of microspheres. Water is added to total 25% to 80% of the final wet coating composition. An antifoam agent of from 0% to 1% dry weight to total weight of the final wet coating composition is preferred. The most preferred ratios of components of the coating composition of the present invention are: 70 to 300 parts by dry weight of microspheres for each 100 parts by dry weight of acrylic polymer latex, 0.1% to 1% dry weight each of surfactant and dispersant to dry weight of microspheres, water totaling 40% to 60% of the final wet coating composition and antifoam agent of from 0.1% to 0.5% dry weight to total weight of the final wet coating composition.

An alternative method utilizes microspheres of phase change material which are not completely dried during the manufacturing process. Wet microspheres containing from about 25% to about 65% by weight water are preferred and can be readily handled. When using such microspheres, a surfactant and a dispersant are added to a polymer binder dispersion before the wetted microspheres are dispersed therein. DOS and Strodex PK90™ are preferably mixed with the polymer binder dispersion before the wet microspheres are mixed with and dispersed therein.

Generally speaking, phase change materials have the capability of absorbing or releasing thermal energy to reduce or eliminate heat transfer at the temperature stabilizing range of the particular temperature stabilizing material. The phase change material inhibits or stop the flow of thermal energy through the coating during the time the phase change material is absorbing or releasing heat, typically during the material's change of phase. This action is transient, i.e., it will be effective as a barrier to thermal energy until the total latent heat of the temperature stabilizing material is absorbed or released during the heating or cooling process. Thermal energy may be stored or removed from the phase change material, and can effectively be recharged by a source of heat or cold. By selecting an appropriate phase change material, a substrate can be coated for use in a particular application where the stabilization of temperatures is desired. Two or more different phase change materials can be used to address particular temperature ranges and such materials can be mixed.

Paraffinic hydrocarbon phase change materials suitable for incorporation into substrate coatings are shown below in Table I. The number of carbon atoms contained in such materials and is directly related to the melting point of such materials.

TABLE I

| COMPOUND | NO. CARBON ATOMS | MELTING POINT °C. |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Phase change materials such as the listed paraffinic hydrocarbons are preferably formed into microspheres and encapsulated in a single or multi-layer shell of gelatin or other materials. Encapsulated microsphere diameters of from 1 to 100 microns are preferred, most preferably in the range 10 to 60 microns. Encapsulated microspheres containing phase change materials are sometimes referred to herein as "microPCMs." Microspheres may also be bound in a silica matrix of sub-micron diameters. Microspheres containing n-octadecane or n-eicosane are suitable for substrate coatings for clothing. Such microspheres are available from MacGill Enterprises, Inc. of West Milton, Ohio and Microtek Laboratories, Inc. of Dayton, Ohio.

EXAMPLE I

A preferred coating formulation for application to a skived polyurethane foam 90 mils thick, is prepared as shown in Table II.

TABLE II

| COMPONENT | WT % | DIRECTIONS |
|---|---|---|
| MICROSPHERE DISPERSION: | | |
| Water | 35.00 | |
| 75% DOS | 0.40 | |
| Strodex PK90 (90% NV) | 0.20 | |
| K18 microspheres (dry) | 36.50 | |
| Acrysol ASE60 (28% NV) | 1.00 | Mix, dispersing ingredients well. |
| AF9020 (20% NV) | 0.05 | Mix slowly with dispersed ingredients until foam dissipates. |
| Ammonium hydroxide (28%) | 0.50 | Add slowly to the defoamed dispersion, with good mixing. Let stand 6 hours. Remix immediately before use. |
| POLYMER BINDER DISPERSION: | | |
| Hycar XT9202 latex polymer | 21.35 | |
| 75% DOS | 0.20 | |
| Strodex PK90 | 0.10 | |
| Acrysol ASE60 (28% NV) | 3.40 | |
| Hercules Advantage 831 | 0.30 | Mix ingredients slowly until foam dissipates. |
| COATING: | | |
| Ammonium Hydroxide | 1.00 | Slowly add Microsphere Dispersion to Polymer Binder Dispersion; add ammonium hydroxide slowly with good mixing thereto. |

A coated substrate is produced using the coating like that of Example I and a conventional polyester urethane skived foam 90 mils in thickness bonded to a tricot, open mesh fabric. Using a knife-over-roll coating head configuration, an acceptable dry weight of 2.5 ounces of encapsulated phase change material per square yard of skived foam was obtained after curing. In this configuration, distribution and penetration of encapsulated phase change material into the open cell configuration of the skived foam was less than 50% of the thickness of the skived foam.

While the aforementioned coated substrate was satisfactory in terms of structural integrity, optimal thermal conductivity was not achieved. Increased loading of the microencapsulated phase change material and increased penetration of into the open celled structure of the skived foam to greater than 50% of the thickness of the skived foam was desired for greater thermal control. It has been discovered that decreasing viscosity of the uncured polymer binder to from approximately 3,000 centipoise to approximately 15,000 centipoise allowed for substantially increased loading, with a preferred viscosity of from approximately 6,000 centipoise to approximately 10,000 centipoise, and a most preferred viscosity of from approximately 7,000 centipoise to approximately 9,000 centipoise.

EXAMPLE II

A most preferred coating formulation where high phase change material content and substantial extensibility is required, for example a skived polyester foam 90 mils thick, is prepared as sown in Table III.

TABLE III

| COMPONENT | WT % | DIRECTIONS |
|---|---|---|
| Water | 6.70 | |
| 75% DOS | 0.43 | Dissolve in water. |
| Strodex PK90 (90% NV) | 0.23 | Dissolve and water. |
| ACRYNOL 35D | 48.00 | Add to water solution and mix. |
| K18 microspheres (dry) | 41.03 | Add slowly to ACRYNOL mixture. |
| AF9020 (20% NV) | 0.07 | Mix slowly with dispersed ingredients until foam dissipates. |
| Hercules Advantage 831 | 0.09 | Mix ingredients slowly until foam dissipates. |
| Acrysol ASE60 (28% NV) | 2.71 | Mix slowly, dispersing ingredients well. |
| Ammonium hydroxide (28%) | 0.74 | Add slowly to the defoamed dispersion, with good mixing. |

The coating of Example II used to manufacture a coated fabric-backed skived foam of the present invention preferably has a pH of from 8.5 to 9.6, and a percent solids of from 48.5% to 50.5%. A viscosity of the uncured polymer dispersion is acceptable in the range of approximately 3,000 to approximately 15,000 centipoise, with a viscosity of from approximately 6,000 to approximately 10,000 centipoise preferred, and a viscosity of from approximately 7,000 to approximately 9,000 centipoise most preferred.

Referring now to FIG. 1, a coated substrate 10 is produced using the coating 12 like that of Example II and a conventional polyester urethane skived foam 14 which is preferably 90 mils in thickness bonded to a tricot, open mesh fabric 16. Using a knife-over-roll coating head configuration, a excellent dry weight of 3.4 ounces of encapsulated phase change material 18 per square yard of skived foam 14 was obtained after curing. In this configuration, distribution and penetration of encapsulated phase change material into the open cells 20 of the skived foam 14 was at or greater than 50% of the thickness of the skived foam 14.

In the configuration just described, the microencapsulated phase change materials were selected to have an effective phase change range of approximately 79° F. to approximately 83° F. This phase change temperature was selected because of its capability to provide a cooling sensation when the cured and coated skived foam fabric article comes in contact with a person's skin. Such a configuration is useful which utilized as a shoe liner in athletic shoes.

In another configuration, PBNII™, an embossed Cerex™ sheet, is bonded to one surface of a 50 mil thick polyurethane skived foam sheet. The opposing surface of the polyurethane skived foam sheet is coated with the uncured polymer binder containing encapsulated phase change materials as described above in Example II and Table III, to obtain a dry weight of phase change material, after curing, of approximately 4.4 ounces per square yard of skived foam.

To achieved a coated skived foam suitable for use in applications where higher moisture vapor transmission rates are desired but water is repelled, a polyurethane film approximately 30 mils thick is bonded to one surface of a 50 mil thick polyurethane skived foam sheet. The opposing surface of the polyurethane skived foam sheet is coated with the uncured polymer binder containing encapsulated phase change materials as described above in Example II and Table III, to obtain a dry weight of phase change material, after curing, of approximately 6.0 ounces per square yard of skived foam.

Figure 2:
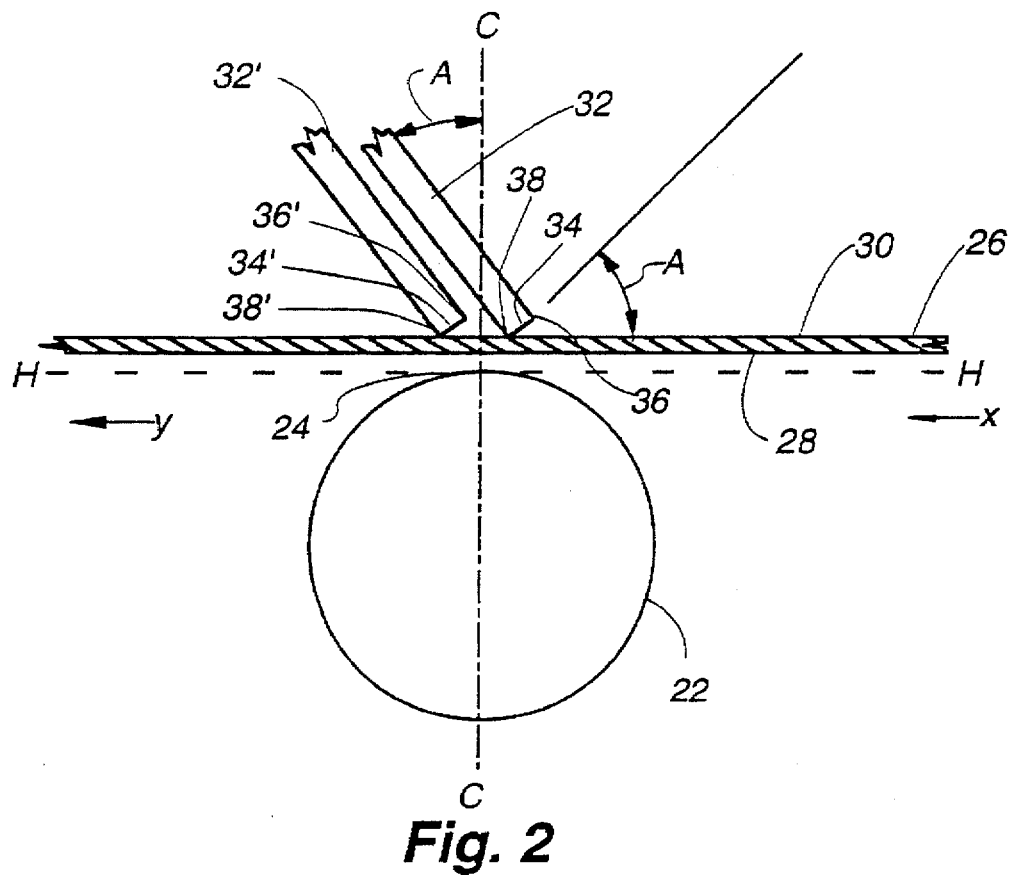
FIG. 2 is a section view knife and roll configuration with which the coating method of the present invention may be practiced to manufacture the coated article shown in FIG. 1.

In order to achieve a coated article of the present invention in which the polymer binder/microencapsulated phase change material dispersion is dispersed into the skived foam to a depth of 50% or more of the thickness of the skived foam, an improved knife-over-roll configuration technique was developed which roved to be especially effective to force the dispersion into the open cell structure of the skived foam. Referring now to FIG. 2, a roll 22 has a centerline "C—C" which is substantially perpendicular to a horizontal plane "H—H" tangential to an upwardly facing surface 24 of the roll 22. A fabric-backed skived foam substrate 26 is passed in a direction from position "X" to position "Y" over the roll 22, substantially in alignment with the plane H—H, with an exposed fabric surface 28 of the fabric-backed skived foam substrate 26 facing substantially downward and an exposed skived foam surface 30 facing substantially upward. A knife 32 or 32' is positioned over the roll 22. The knife 32 or 32' has an approximately ¼" wide flat leading blade 34 or 34' having a leading edge 36 or 36' and a trailing edge 38 or 38'. Preferably, the knife 32 is positioned over the roll 22 with either its trailing edge 38 positioned approximately ¼" in front of the centerline C—C or the knife 32' if positioned with its leading edge 36' approximately ¼" behind the centerline C—C. The knife is positioned at an angle "A" approximately 5° to 35°, preferably 10° to 15°, and most preferably 11° to 13° back away from the centerline C—C, making the edge 34 or 34' approximately the same angle A off of the horizontal plane H—H with which the substate to be coated is aligned. A polymer binder/ microencapsulated phase change dispersion having a preferred viscosity of approximately 7,000 to approximately 9,000 centipoise is applied to the exposed surface skived foam surface 30 of the fabric-backed skived foam substrate 26 with the knife-over-roll configuration just described, to produce a coated skived foam fabric-back article after curing using conventional techniques.

Presently preferred embodiments of the present invention and many of its improvements have been described with a degree of particularity. It should be understood that this description has been made by way of preferred examples, and that the invention is defined by the scope of the following claims.

What is claimed is:

1. A coated article, comprising:
   a fabric sheet;
   a cured foam substrate having an open cell configuration and opposed first and second surfaces, wherein said first surface is mounted to said fabric sheet;
   a polymer binder bonded to said second surface of said cured foam substrate and penetrating at least 50% of said foam substrate; and
   microspheres containing a phase change material dispersed in said binder and throughout said at least 50% of said foam substrate, wherein said foam substrate is cured prior to penetration of said cured foam substrate by said polymer and dispersion of said cured foam substrate by said michospheres.

2. The article of claim 1 wherein said phase change material is a paraffinic hydrocarbon.

3. The article of claim 2 wherein said foam substrate is a skived foam.

4. The article of claim 2 wherein said binder comprises a latex material.

5. The article of claim 4 wherein said foam substrate is a skived foam.

6. The article of claim 3 wherein said skived foam substrate is from 20 mils to 90 mils in thickness and said phase change materials weigh collectively from approximately 1¼ to approximately 7 ounces per square yard.

7. The article of claim 4 wherein said skived foam substrate is from 20 mils to 90 mils in thickness and said phase change materials weigh collectively from approximately 1¼ to approximately 76 ounces per square yard.

8. The article of claim 3 wherein said skived foam is a polyurethane foam.

9. A coated article according to claim 1 wherein said polymer binder has a viscosity of from approximately 3,000 centipoise to approximately 15,000 centipoise.

10. A coated article according to claim 1 wherein viscosity of said polymer binder is from approximately 6,000 to 9,000 centipoise.

11. A coated article according to claim 5 wherein said polymer binder has a viscosity of from approximately 3,000 centipoise to approximately 15,000 centipoise.

12. A coated article according to claim 5 wherein viscosity of said polymer binder is from approximately 6,000 to 9,000 centipoise.

13. A coated article according to claim 2 wherein said polymer binder has a viscosity of from approximately 3,000 centipoise to approximately 15,000 centipoise and said foam substrate is a skived polyester urethane foam.

14. An article comprising:
    a cured foam substrate having a outer surface;
    a dispersion permeating said foam substrate and comprising a polymer binder and microspheres containing a phase change material, wherein said foam substrate is permeated by said dispersion after said foam substrate is cured; and
    a sheet attached to said outer surface of said cured foam substrate.

15. An article according to claim 14 wherein said foam substrate is a skived foam and said polymer binder has a viscosity of from approximately 3,000 centipoise to approximately 15,000 centipoise.

16. An article according to claim 14 wherein said foam substrate is a skived polyester urethane foam and said polymer binder has a viscosity of from approximately 6,000 centipoise to approximately 9,000 centipoise.

17. An article according to claim 14 wherein said foam substrate is a skived foam, said polymer binder has a viscosity of from approximately 3,000 centipoise to approximately 15,000 centipoise, and said phase change material includes a paraffinic hydrocarbon.

* * * * *